Sept. 20, 1966 P. HAMAKER ETAL 3,273,695
PROCESS AND APPARATUS FOR LOCKING MEMBERS
TO CABLES AND THE LIKE
Filed July 29, 1964 2 Sheets-Sheet 1
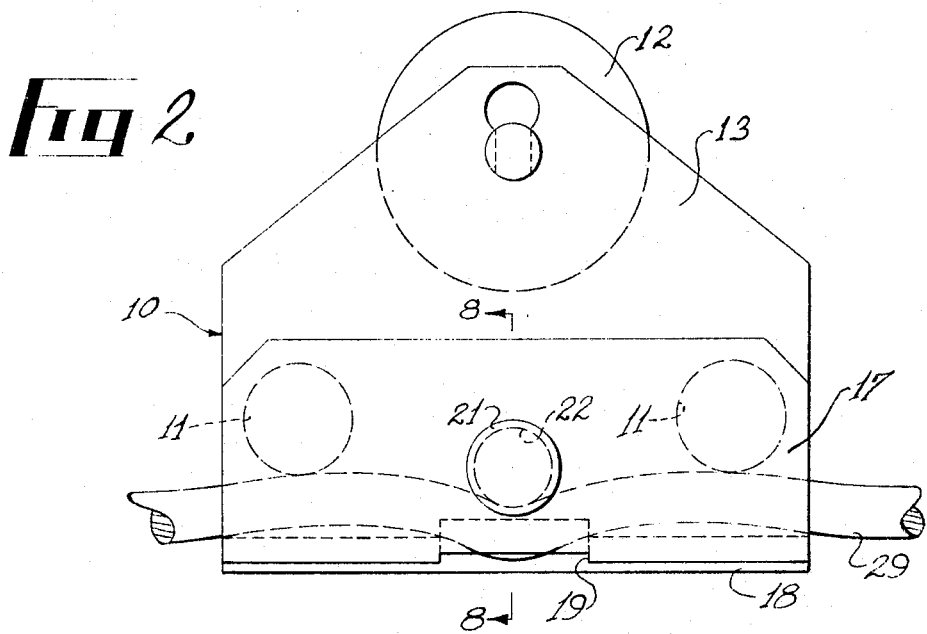
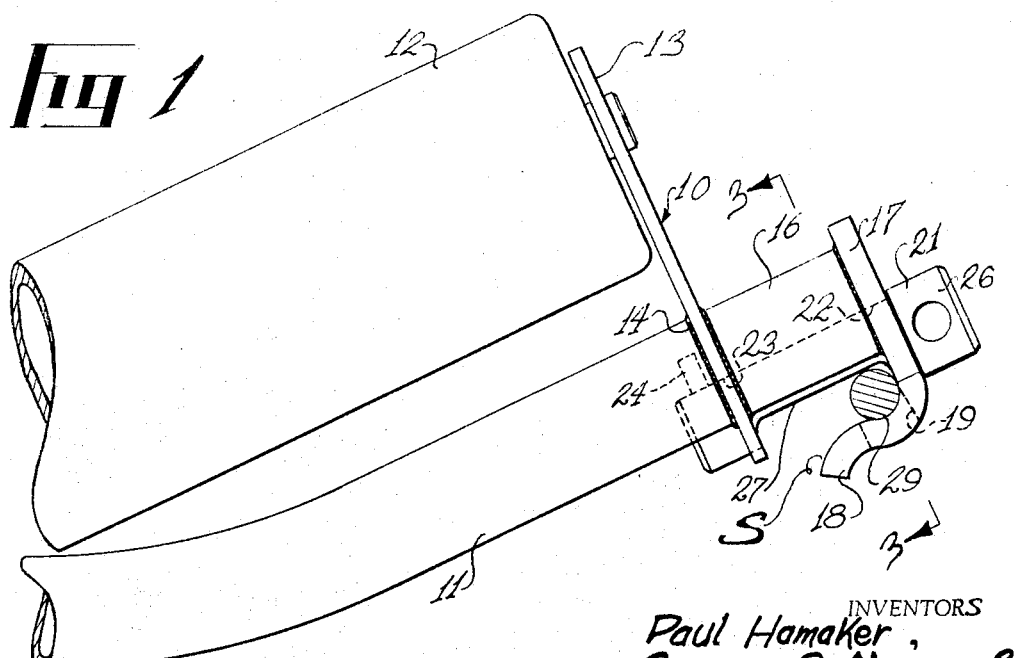
INVENTORS
Paul Hamaker,
George C. Morgan &
Jeff R. Powell, Jr.
By Jennings Carter & Thompson
Atty's

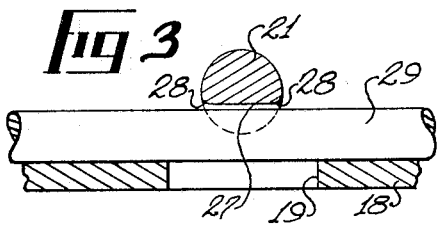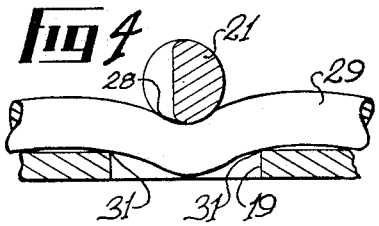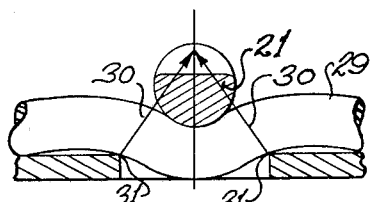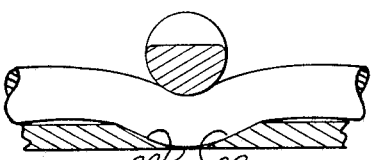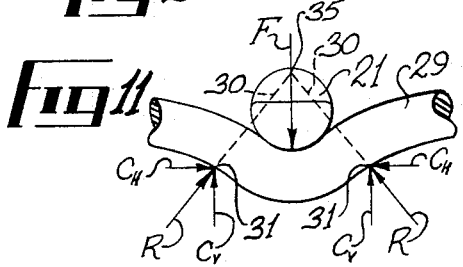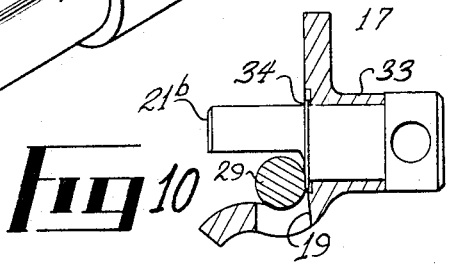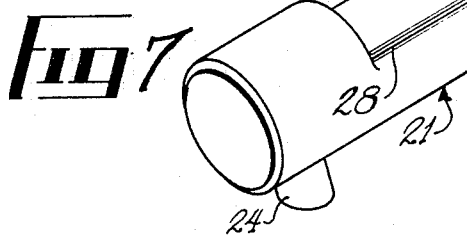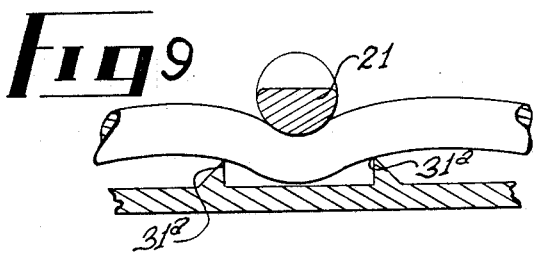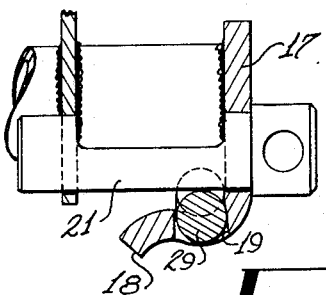

3,273,695
PROCESS AND APPARATUS FOR LOCKING MEMBERS TO CABLES AND THE LIKE
Paul Hamaker, George C. Morgan, and Jeff R. Powell, Jr., all of Birmingham, Ala., assignors to Transall, Inc., a corporation of Alabama
Filed July 29, 1964, Ser. No. 385,860
2 Claims. (Cl. 198—192)

This invention relates to cable supported apparatus and more particularly to means for securing the cable or rope to the apparatus to be supported, such as the idler roller assembly of a cable supported belt conveyor.

Heretofore in the art to which our invention relates various clamping and securing devices have been proposed and used for securing idler roll assemblies and the like to cables or ropes whereby a truly portable belt conveyor is provided. These clamping devices generally take the form of a wedge, cam, or an eccentrically mounted roller which, when operated, presses the cable against a back-up plate. Other devices are designed to tighten when the cable moves relative to the clamping device. These devices do not provide a positive clamping action by which the assembly can be positioned at a definite predetermined point along the cable and then locked in place without any possibility of being moved from such place during the clamping operation or after clamping. Furthermore, in prior art devices tension in the cable works against the clamping and locking action and they tend to loosen in service. Also when placing prior assemblies on the cable it is generally necessary to remove one or more parts.

In view of the foregoing, it is the primary object of our invention to provide a positive clamping means for securing idler roll assemblies and the like to suspended cables whereby such assemblies are positively locked in place at predetermined positions along the cables.

Another object of our invention is to provide clamping means of the character designated which takes advantage of the tension in the cable firmly to lock the clamp in position.

Still another object of our invention is to provide clamping means of the character designated which is so designed as to allow the positioning of the idler roll or like assembly on the cable without the use of removable parts such as nuts, bolts, wedges and the like.

A further object of our invention is to provide clamping means of the character designated which is simple and durable in operation and is economical and easy to manufacture.

Apparatus embodying features of our invention is illustrated in the accompanying drawings which form a part of this application and in which:

FIG. 1 is a fragmental front elevational view partly broken away and in section;

FIG. 2 is an end elevational view partly broken away and in section;

FIG. 3 is a sectional view taken generally along line 3—3 of FIG. 1 and showing the pin in the inoperative or open position;

FIG. 4 is a view corresponding to FIG. 3 showing the pin in the camming position;

FIG. 5 is a view corresponding to FIG. 3 showing the pin in operative position;

FIG. 6 is a fragmental sectional view corresponding to FIG. 5 and showing a second embodiment of the clamping device;

FIG. 7 is an isometric view of the clamping pin;

FIG. 8 is a sectional view taken generally along line 8—8 of FIG. 2 and showing the cable clamped in the slot;

FIG. 9 is a sectional view corresponding generally to FIG. 5 and showing another embodiment of the clamping device;

FIG. 10 is a sectional view showing still another embodiment of the clamping device; and, FIG. 11 is a force diagram showing the disposition of forces when the pin is in operative position.

Referring now to the drawings for a better understanding of our invention, we show at 10 an idler roller frame assembly comprising a tubular frame 11 and idler rollers 12. The rollers 12 are mounted on plate 13 which is welded at 14 to the tubular members 11. The tubular members 11 pass through the end plate 13 and extend outwardly therefrom as at 16. On the outermost extremities of the tubular members is welded the clamp bracket 17.

As will be more clearly understood by referring to FIGS. 1 and 2, the clamp bracket 17 carries an inwardly projecting flange-like member 18 in the base of which is a slot 19. Our improved locking pin 21 passes through a hole 22 in the bracket 17 which is directly above and slightly spaced from the slot 19, as is clearly indicated in FIG. 2. The pin 21 also passes through a hole 23 in the plate 13. The pin 21 carries a restraining pin 24 which prevents the pin 21 from sliding outwardly of the holes 22 and 23, while an enlarged head portion 26 on the pin 21 prevents the pin from sliding inwardly of the holes 22 and 23.

As shown in FIG. 7, the locking pin is generally cylindrical in shape and has a cable receiving portion 27 formed in one side thereof by reduction of the radial dimensions of that side. This cable receiving portion may be a generally flattened surface as illustrated or a cutaway of either convex or concave profile so long as the cable receiving portion allows a cable to be freely positioned between the pin 21 and the flange 18, as hereinafter described in greater detail. The cable receiving portion 27 merges into the cylindrical body of the pin 21 with a smoothly curving surface as shown at 28, thus forming a cam surface between the portion 27 and the cylindrical surface of the pin.

As shown in FIG. 1 the flange portion 18 of the bracket 17 is spaced from the end plate 13 as indicated at S whereby the assembly may be positioned on a cable 29 by slipping the cable through the space S. It will be understood that during assembly the pin 21 is turned with the cable receiving portion 27 facing toward the opening as shown in the drawing, whereby the cable may pass between the pin 21 and the flange 18.

With the cable in position resting against the juncture of the bracket 17 and the flange portion 18, the clamping operation is performed by rotating the pin 21 so as to bring the cylindrical surface of the pin into contact with the cable, as illustrated in FIGS. 3, 4 and 5. It will be noted that in FIG. 3 the pin 21 is shown in the open position with the cable 29 in place between the cable receiving portion of the pin 27 and the flange of the bracket 18. In FIG. 4 the pin is rotated to the clamping position. This illustrates action of the pin in deflecting the cable below the level of the bearing points 31 and into biting engagement therewith. As the pin is rotated the cable is deflected into the slot 19 and forced into frictional engagement with the edges or points 31 thereof. After the cable 29 is so deflected the pin is rotated until it is assumes the position shown in FIGS. 5, 8 and 11. In this position the pin exerts a pressure or force F against the cable, along a line passing substantially through the rotational axis of the pin, thereby holding the cable in biting contact with the edges 31. As shown by the lines 30, 30 in FIG. 11, the reactive forces R on the cable at the points 31 are substantially equal and lie along lines which intersect substantially at a common point 35 lying in a vertical plane including the rotational axis of pin 21. Thus, there is no tendency for the pin to rotate. That is to say, the pin 21 is in static balance, there being no forces exerted by the cable on the pin that tend to cause the pin to rotate to release position. The vertical components $C_v$ of the reactive forces R support the cable while the horizontal components $C_h$ are of sufficient magnitude to resist lateral movement of the cable. As shown in FIG. 8, the slot 19 confines the cable and thus prevents it from deforming laterally under pressure of the pin. Furthermore, the tendency of the cable to straighten due to the tension further locks the clamp in position, preventing rotation of the pin and multiplying the effects of the reactive forces. This tension may be the natural tension in a suspended cable which is due to the weight of the cable, or it may be a tension put into the cable when it is suspended. It is common for cables for belt conveyors to be put under 3,000 to 4,000 pounds of tension.

In FIG. 6 we show another embodiment of our invention in which the edges of the slot 19 are tapered as at 32 whereby a wedging action results. The operation of this embodiment is substantially the same as discussed above, this embodiment being particularly adapted for carrying somewhat heavier loads.

Still another embodiment is shown in FIG. 9. In this embodiment of our invention we provide raised cable gripping or bearing surfaces 31$^a$ instead of the slot 19 of the first embodiment. The bearing surfaces or points 31$^a$ correspond to and operate as do the edges 31 of slot 19. That is to say, the edges 31 are actually themselves sharp-edged bearing points against which the cable 29 is forced by the pin 21, and from which the reactive locking forces arise. The cable 29 is deformed or bent between the bearing points 31 or 31$^a$, as the case may be, thereby locking the cable in position in the clamp.

In FIG. 10 we show still another embodiment of our invention. In this embodiment we provide a bearing 33 on the plate 17 long enough and strong enough to support the pin 21$^b$ in cantilever fashion. The operation of this embodiment is the same as discussed above, the pin 21 being supported at one end only instead of both ends. An annular ring 34 is provided to prevent the pin from sliding outwardly of the clamp.

Although we have shown the pin as having a radially reduced portion on only one side thereof, the clamp would operate in substantially the same manner if radially reduced portions were provided on two or more sides of the pin so long as a cylindrical surface is provided between the radially reduced portions.

From the foregoing it is seen that we have devised a new and improved clamping means for securing cable supported belt conveyor assemblies and the like, such as the idler roller assembly, to the supporting cable. By providing sharp-edged bearing points on the flange portion of the bracket between which the cable is deformed by the camming action of the pin, thereby forcing the cable into biting contact with the bearing points, we achieve a positive locking action on the cable. When the pin is rotated to the position shown in FIGS. 5 and 8, the cylindrical portion of the pin exerts a continuing pressure against the cable which holds the cable in biting, locking contact with the bearing points. Such pressure provides forces having no unbalanced components tending to rotate the pins. The clamp is operated by inserting a tang or other suitable tool in a hole provided in the enlarged end 26 and then turning the pin 21 so as to bring the cylindrical surface of the pin into contact with the cable. The clamp is simple, easily operated, inexpensive to manufacture, durable and provides a positive locking action.

While we have shown our invention in association with an idler roller assembly, we wish to emphasize that it is clearly adaptable to other devices and assemblies which are to be supported on or connected to cables and like structures.

It is to be understood that when we use the word "cable" in this application and in the appended claims we intend to refer to any cable-like member such as a rope, wire, or the like.

While we have shown our invention in several forms, it will be obvious to those skilled in the art that it is not so limited but is susceptible of various other changes and modifications without departing from the spirit thereof, and we desire, therefore, that only such limitations shall be placed thereupon as are specifically set forth in the appended claims.

What we claim is:
1. For use as a clamp for securing a cable,
   (a) a plate having a laterally directed cable engaging flange on one side thereof,
   (b) there being a slot in said flange adjacent the juncture of said flange and said plate,
   (c) cable engaging bearing points on the flange adjacent opposite ends of the slot and disposed to be engaged by the cable,
   (d) a second plate parallel to and spaced from said first plate and said flange a distance sufficient to permit the cable to be passed therebetwen thereby to be positioned at the juncture of the first plate and said flange and over the slot,
   (e) a cylindrical cable locking pin member having a substantially flat surface on one side located intermediate the ends thereof and a generally cylindrical surface on the other side thereof opposite said flat surface,
   (f) there being a curved cam-like surface joining said flat surface and said cylindrical surface,
   (g) said pin member having its cylindrical ends rotatably mounted in aligned holes in said first and second plates and with its intermediate portions extending across said flange and the slot therein,
   (h) said intermediate portion of the pin member being so dimensioned and positioned that when said flat surface is rotated to face said slot the cable may be inserted between the flat surface of the pin and said flange and when the flat surface is rotated to face away from the slot on the cable is forced into the slot and into biting, locking engagement with the said bearing points, and
   (i) means for rotating said pin.
2. For use as a clamp for securing a cable,
   (a) a plate having a laterally directed cable engaging flange on one side thereof,
   (b) there being a slot in said flange adjacent the juncture of said flange and said plate,
   (c) cable engaging bearing points on the flange adjacent opposite ends of the slot and disposed to be engaged by the cable,
   (d) an elongated cylindrical bearing for a locking pin carried by the plate the axis of which is disposed normally of and out of the plane of the longitudinal axis of the cable to be clamped,
   (e) a cable locking pin having a cylindrical portion journaled in said bearing and having an end portion projecting above and across said flange and the slot therein,
   (f) the projecting end portion of said pin being flattened on one side and cylindrical on the opposite side,

(g) said projecting end of the pin being so dimensioned and positioned relative to said flange and slot that when said flattened side is rotated to face said slot the cable may be inserted by laterally moving it between the flange and flattened side and when the cylindrical side of said end of the pin is rotated to face said slot the cable is forced into the slot and into biting, locking engagement with said bearing points, and (h) means for rotating said pin.

References Cited by the Examiner

UNITED STATES PATENTS

| | | | |
|---|---|---|---|
| 387,650 | 8/1888 | Lovejoy | 24—132 |
| 798,962 | 9/1905 | Harris | 254—83 |
| 1,748,301 | 2/1930 | McKinlay | 198—192 |
| 2,903,770 | 9/1959 | Hagenbook | 198—192 |
| 3,211,276 | 10/1965 | Dilgard | 198—192 |

EVON C. BLUNK, *Primary Examiner.*

RICHARD E. AEGERTER, *Examiner.*